Feb. 16, 1943.   C. DONGES   2,310,942
AUTOMOBILE JACK
Filed Oct. 24, 1940   3 Sheets-Sheet 1
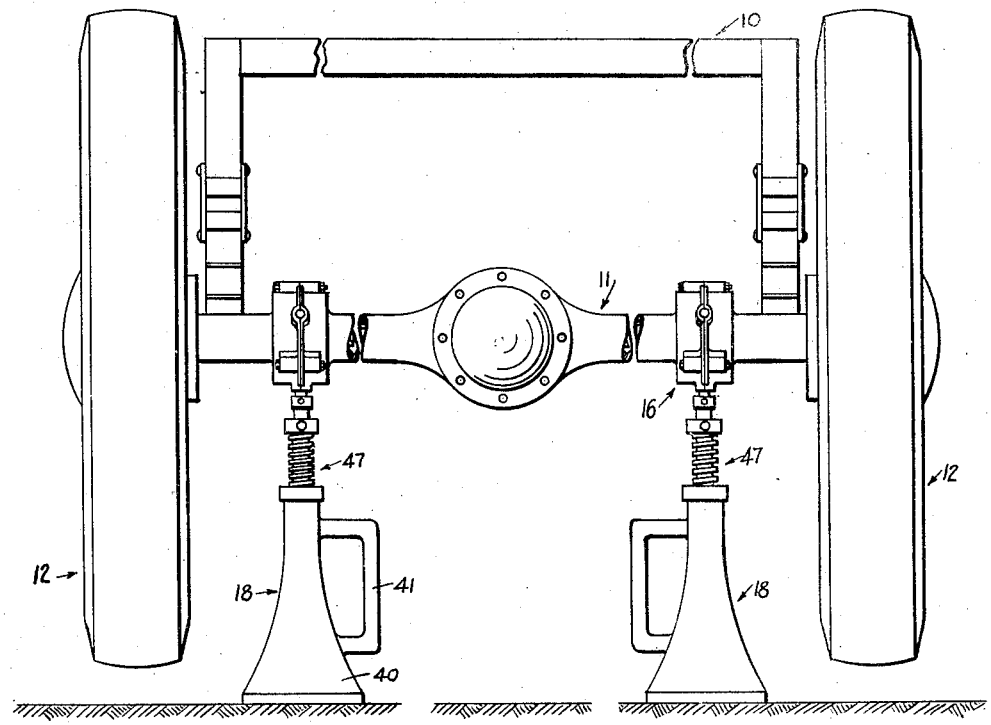
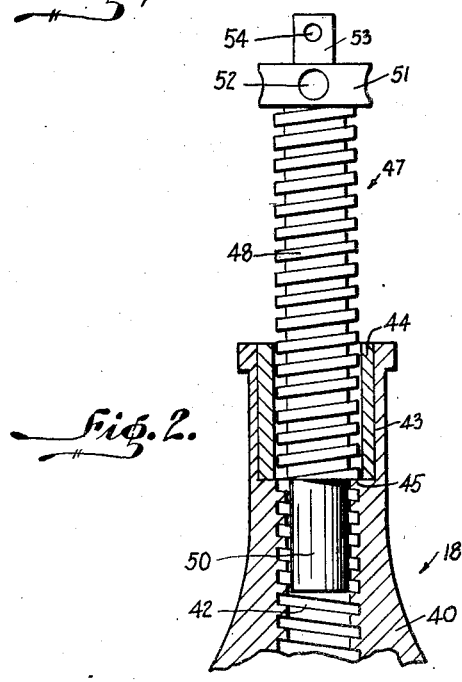
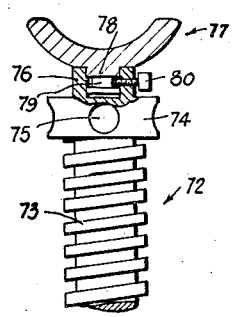
INVENTOR.
CONRAD DONGES.
BY Carl Miller Feb. 16, 1943.  C. DONGES  2,310,942
AUTOMOBILE JACK
Filed Oct. 24, 1940  3 Sheets-Sheet 2
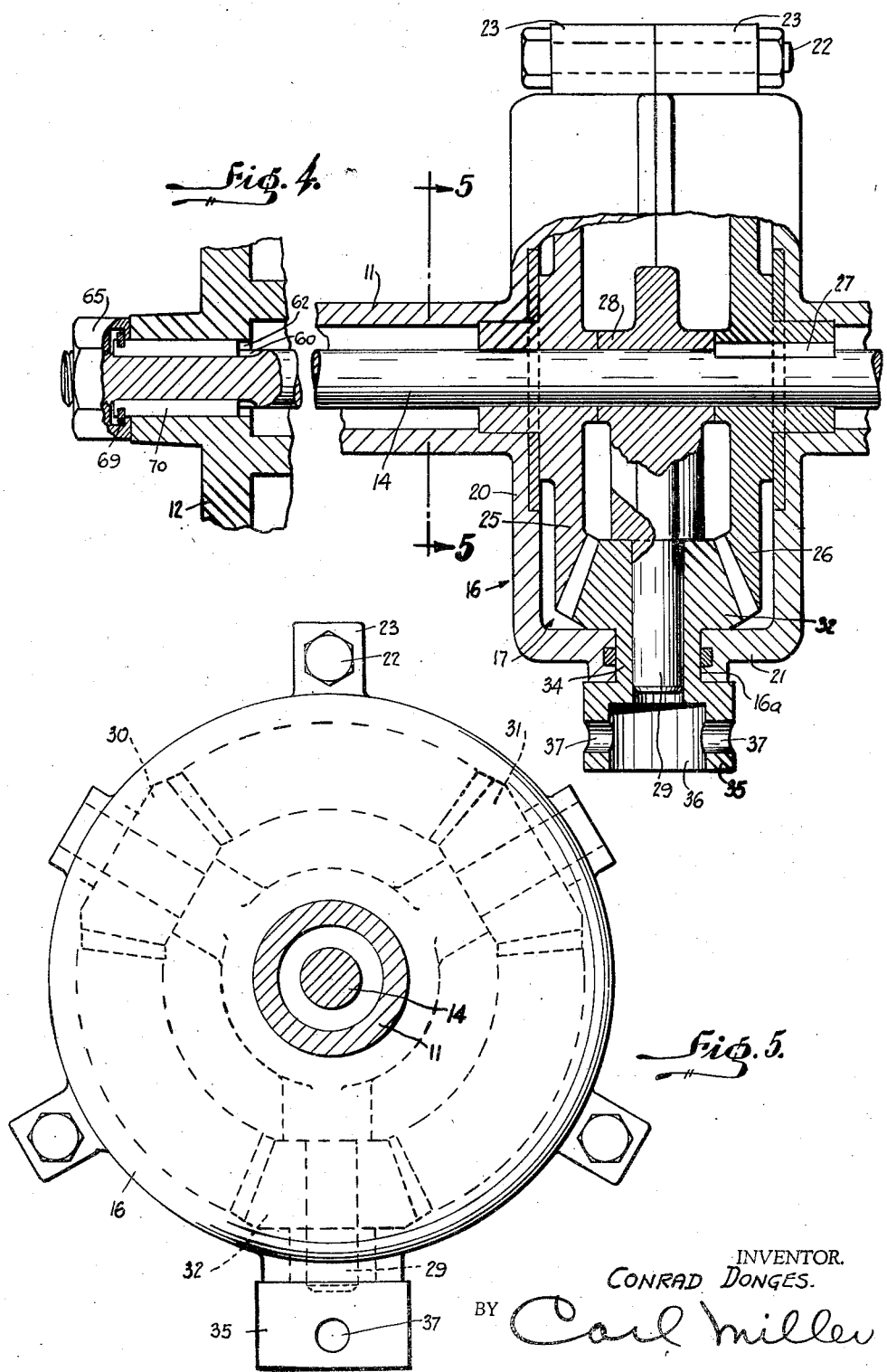
INVENTOR.
CONRAD DONGES.
BY Carl Miller Feb. 16, 1943.　　　　C. DONGES　　　　2,310,942
AUTOMOBILE JACK
Filed Oct. 24, 1940　　　　3 Sheets-Sheet 3

INVENTOR.
CONRAD DONGES.
BY Carl Miller

Patented Feb. 16, 1943

2,310,942

UNITED STATES PATENT OFFICE 2,310,942

AUTOMOBILE JACK

Conrad Donges, Secaucus, N. J.

Application October 24, 1940, Serial No. 362,565

6 Claims. (Cl. 254—86)

This invention relates to automobile jacks.

An object of this invention is to provide an automobile jack which shall be operated by the driving gear of the automobile.

A further object of this invention is to provide an automobile jack of the character described which may be operated directly by the rear axle, means being further provided to quickly connect and disconnect the rear axle from the wheels, so that the wheels will not turn when the jack is operated to lift the automobile, and so that the wheels may be easily connected to the axle while the automobile is in lifted condition, so that as the jack is reversed to lower the automobile, the wheels upon contacting the ground will drive the automobile slightly forward to permit easy removal of the jack.

Yet a further object of this invention is to provide a strong, rugged and compact automobile jack construction, which shall be relatively inexpensive to manufacture, sure and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown various possible illustrative embodiments of this invention, Fig. 1 is a rear end elevational view of a portion of an automobile or similar vehicle, provided with a pair of jacks embodying the invention;

Fig. 2 is a partial, elevational, cross-sectional view of one of the jacks;

Fig. 3 is a partial, elevational view of a jack embodying the invention adapted to be operated manually;

Fig. 4 is an elevational, partial, cross-sectional view through a part of the rear axle housing, and one of the jack operating mechanisms;

Fig. 5 is a cross-sectional view taken on line 5—5 of Fig. 4;

Figure 6:
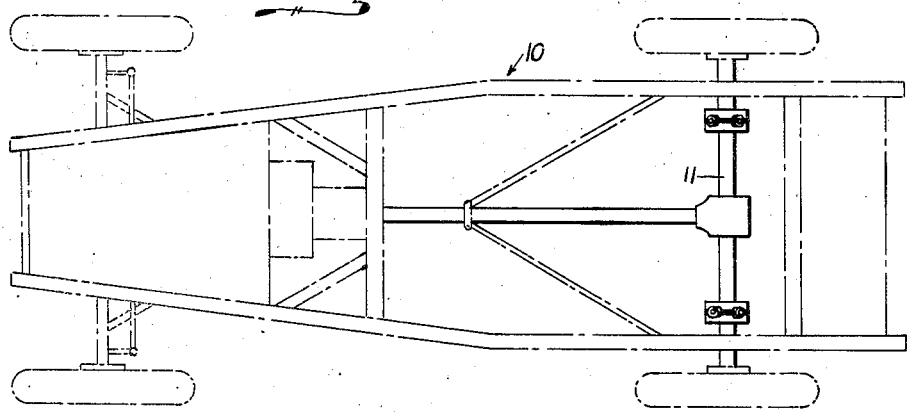
Fig. 6 is a top plan view of an automobile with the chassis removed, and illustrating the jack operating mechanism on the rear axle housing.
Figures 7, 9, 10:
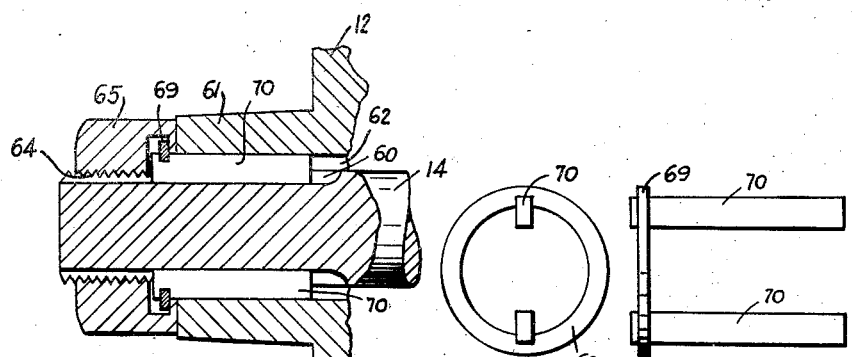
Fig. 7 is an elevational, cross-sectional view of the mechanism to connect the wheel for rotation with the rear axle embodying the invention.
Fig. 9 is a side elevational view of part of the connecting mechanism.
Fig. 10 is an end view thereof.
Figure 8:
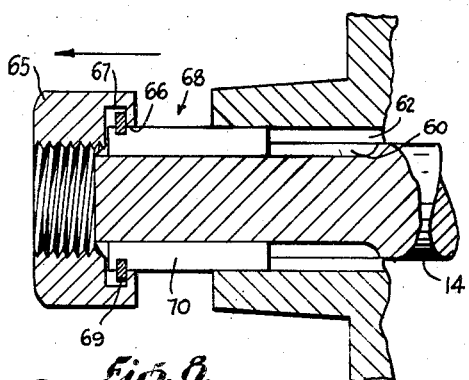
Fig. 8 is a view similar to Fig. 7, but illustrating the means for disconnecting the axle from the wheel.

Referring now in detail to the drawings, 10 designates an automobile frame provided with jack mechanism embodying the invention. In the drawings, 11 designates the rear axle housing, 12, the rear wheels. Within the rear axle housing is the rear axle 14. The rear axle housing 11 is provided on opposite sides of the mid-portion thereof with chambers 16 housing mechanism 17 for operatively connecting the jacks 18 to the rear axle 14.

Each housing or chamber 16 comprises parallel side walls 20 and an annular wall 21 bolted together by bolts 22. The housing 16 may be split centrally into two parts, the two parts being provided with lugs or bosses 23 receiving the bolts 22. The rear axle 14 passes through the housings.

Within each housing is a pair of similar, symmetrically disposed beveled gears 25 and 26. One of the gears 26 is splined to the rear axle 14 by a key 27. Rotatably mounted on axle 14 and between each pair of beveled gears 25 and 26 is a hub member 28 provided with a plurality of radial stud shafts 29 carrying pinions 30, 31 and 32 meshing with the beveled gears 25 and 26.

It will now be understood that when the rear axle 14 rotates, pinion 32 will also rotate. The stud shaft 29 on which the pinion 32 is mounted is in vertical, downwardly extending position.

The housing 16 is formed with an opening 16a at the bottom and journalled within the opening is a sleeve 34 extending downwardly from the pinion 32. At the lower end of the sleeve 34 is a socket 35 disposed below the housing 16. The socket 35 has a central socket opening 36 and is formed with a pair of diametrically aligned through openings 37 communicating with the socket opening 36, for the purpose hereinafter appearing.

Each jack 18 comprises a base member 40 formed with a handle 41. The base member 40 is formed with a vertical, axial, screw threaded opening 42 terminating short of the upper end thereof. At the upper end of the base 40 is a socket receiving a sleeve 44. At the upper end of the screw threaded opening 42 is a shoulder 45. Screwed within the screw threaded opening 42 is a vertical shaft 47 having a screw threaded portion 48 adapted to mesh with the threads 42. At the lower end of the screw threaded portion 48 is a round rod portion, 50. At the upper end of the screw threaded portion 48 is an enlarged collar 51 formed with a through opening 52. Extending upwardly from the collar 51 is a reduced portion 53 formed with a through opening 54. The reduced portion 53 is adapted to fit within the socket opening 36. Any suitable pin may be passed through the registering openings 37, 54.

It will now be understood that when the rear axle 14 rotates, pinions 32 will rotate to turn the members 47 to lift the rear of the automobile. When the entire screw threaded portions 48 of members 47 reach the positions shown in Fig. 2, the lower ends of the threads of portions 48 will contact the shoulders 45 at the upper ends of the screw threaded openings 42, so that the automobile will not be lifted any more. When the axle is rotated in an opposite direction, members 47 will again mesh with the screw threaded openings 42 to lower the vehicle. When the wheels contact the ground, the automobile will be moved slightly forward to tilt the jacks. For this purpose, the projections 53 are preferably somewhat loose within the sockets 35. The pins may be removed from the registering openings 37, 54, to permit tilting of the jacks.

If desired, the rotation of the axle may be stopped just before the wheels touch the ground, and a rod may be inserted into the opening 52 to complete the lowering of the jacks, while the pin is removed from the registering openings 54, 37.

Means is provided to prevent rotation of the wheels 12 while the jacks are being raised so that the automobile will not be moved forwardly while the wheels still touch the ground. To this end, the rear axle 14 is formed with a plurality of longitudinal key-slots 60 at its outer ends. The wheels 12 are formed with hubs 61 having corresponding keyways or key-slots 62. The outer end of the axle 14 is threaded, as at 64. Screwed to the threaded portion 64 of the axle is a hub 65. The hub 65 is formed with a socket 66 on its inner surface and with an enlarged, internal, annular groove 67 at the bottom of the socket.

Mounted on the axle 14 is a coupling member 68 comprising an annular ring 69 disposed within the annular groove 67. Fixed to the ring 69 are a plurality of longitudinal, parallel keys 70, slidably received within the registering key-slots 60, 62, thus connecting the axle to the wheel. When the hub-cap 65 is unscrewed from the axle, the coupling member 68 is withdrawn from the key-slots 60, 62 to disconnect the axle from the wheel. Thus, before the jacking operation starts the hub-caps are quickly unscrewed so that the rear axle may be rotated without turning the wheels. After the vehicle is sufficiently lifted for the wheels to clear the ground, the hub-cap 65 may again be screwed onto the axle to again connect the wheels to the axle.

Referring now to Fig. 3, there is disclosed a jack 72 adapted for manual operation. The jack 72 comprises a screw threaded member 73 adapted to fit within a screw threaded opening in a base similar to the base 40. At the upper end of member 73 is an annular collar 74 formed with a through opening 75 to receive a bar for turning member 73. Extending upwardly from the collar 74 is a socket 76. Mounted on member 73 is a transversely curved member 77 having a downwardly projecting lug 78 fitted within socket 76 and formed with an annular groove 79 to receive a set screw 80 screwed through an opening in the socket. Member 77 is adapted to receive the rear axle housing. By putting a bar through the opening 75, member 73 may be rotated after lifting the vehicle.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

The improved jack described herein may be operated by the front wheels, as well as from the rear of the vehicle.

Having thus described my invention, I claim as new and desire to secure by Letters Patent:

1. In combination with a vehicle having a rear axle housing, a rear axle within said housing, a chamber on the rear axle housing, a pair of similar, symmetrically disposed, spaced beveled gears on said rear axle and within said chamber, means to spline one of said beveled gears to said rear axle, a hub journaled on the rear axle and disposed between said beveled gears, a plurality of pinions mounted for rotation about radial axes on said hub and meshing with said beveled gears, a jack, and means to connect said jack to one of said pinions.

2. In combination with a vehicle having a rear axle housing, a rear axle within said housing, a chamber on the rear axle housing, a pair of similar, symmetrically disposed, spaced beveled gears on said rear axle and within said chamber, means to spline one of said beveled gears to said rear axle, a hub journalled on the rear axle and disposed between said beveled gears, a plurality of pinions mounted for rotation about radial axes on said hub and meshing with said beveled gears, a jack, means to connect said jack to one of said pinions, a wheel on an end of said axle, and coupling means to connect said wheel to said axle.

3. In combination with a vehicle having a rear axle housing and a rear axle passing through said housing, a chamber on said housing, a pair of similar, symmetrically disposed beveled gears on said axle and within said chamber, means to spline one of said gears to said axle, a pinion journalled within said chamber and meshing with the teeth of said gears, a jack, and means to connect said jack to said pinion.

4. In combination with a vehicle having a rear axle, a pinion, means to operatively connect the axle to the rear axle, whereby to rotate the pinion from the rear axle, a jack, and means to connect the jack to the pinion.

5. In combination with a rear axle of a vehicle and a housing through which the axle passes, a chamber on said housing, a pinion within said housing rotatable about a vertical axis, means to operatively connect the pinion for rotation to said axle, a jack comprising a base having an internally screw threaded opening, and a screw threaded member screwed within said opening, and means to connect the screw threaded member to the pinion.

6. A vehicle having a rear axle housing, a rear axle within said housing, a pair of chambers on said housing on opposite sides of the mid-portion thereof, a pair of similar, symmetrically disposed, beveled gears within each chamber, means to spline one of said beveled gears to the axle, a hub rotatably mounted within each chamber and between the beveled gears, a plurality of radially extending stud shafts on each hub, pinions rotatably mounted on the stud shafts meshing within the beveled gears, one of said pinions having a vertical axis and being formed with a portion projecting through the chamber, and with a socket at the lower end of said portion, a pair of jacks, each comprising a base having an internally screw threaded opening, a screw threaded member screwed within the opening of each base, each screw threaded member having a portion adapted to be received within each socket, means to connect the sockets to the portions of the screw threaded members received therein, wheels on the ends of said axle, said axle and the wheels having registering, longitudinal slots, members screwed to the ends of said axle, and coupling members rotatably and non-slidably connected to the members which are screwed to the ends of said axle, said coupling members having keys slidably received within the registering slots.

CONRAD DONGES